US009609313B2

(12) United States Patent
Codignotto

(10) Patent No.: US 9,609,313 B2
(45) Date of Patent: Mar. 28, 2017

(54) ENHANCED 3D DISPLAY METHOD AND SYSTEM

(71) Applicant: John D. Codignotto, Wantagh, NY (US)

(72) Inventor: John D. Codignotto, Wantagh, NY (US)

(*) Notice: Subject to any disclaimer, the term of this patent is extended or adjusted under 35 U.S.C. 154(b) by 372 days.

(21) Appl. No.: 14/213,436

(22) Filed: Mar. 14, 2014

(65) Prior Publication Data

US 2014/0267635 A1    Sep. 18, 2014

Related U.S. Application Data

(60) Provisional application No. 61/798,760, filed on Mar. 15, 2013.

(51) Int. Cl.
*H04N 13/04* (2006.01)
*H04N 13/02* (2006.01)

(52) U.S. Cl.
CPC ..... *H04N 13/0484* (2013.01); *H04N 13/0278* (2013.01)

(58) Field of Classification Search
CPC ............. H04N 13/0484; H04N 13/0278
USPC .......................................... 348/51
See application file for complete search history.

(56) References Cited

U.S. PATENT DOCUMENTS

2013/0156265 A1* 6/2013 Hennessy ............ A61B 3/113
382/103

* cited by examiner

*Primary Examiner* — Allen Wong
(74) *Attorney, Agent, or Firm* — Leason Ellis LLP

(57) ABSTRACT

A method and system using hardware and software to enhance the realism, capabilities and efficiencies when generating and displaying 3D content is disclosed.

3 Claims, 1 Drawing Sheet

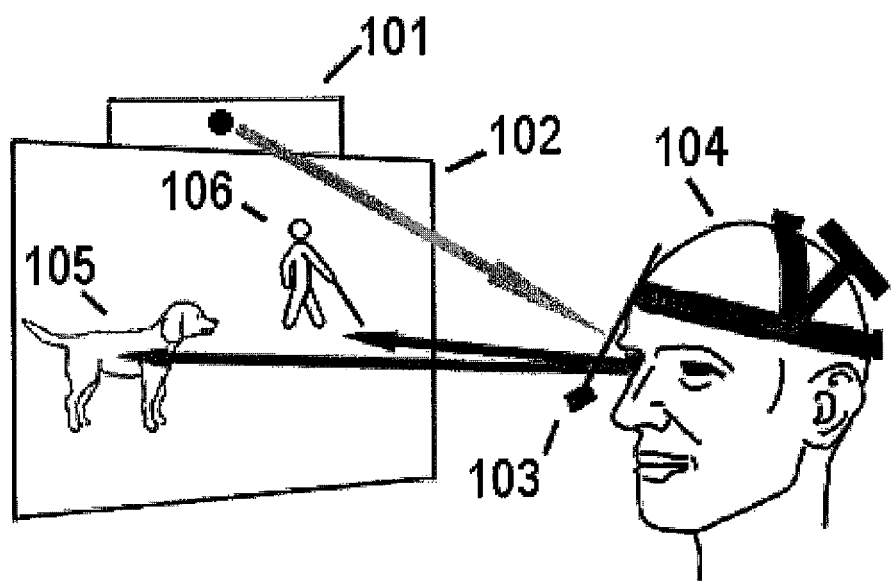

ENHANCED 3D DISPLAY METHOD AND SYSTEM

CROSS REFERENCE TO RELATED APPLICATION

This application is a continuation of U.S. Provisional Patent Application No. 61/798,760, filed Mar. 15, 2013, which is hereby incorporated by reference in its entirety herein.

FIELD OF THE INVENTION

The invention relates to the field of generating, rendering and displaying 3D content to one or more viewers.

BACKGROUND OF THE INVENTION

The ability to view movies (content) in three-dimensions (3D) has existed for decades, mostly limited to movie theater experiences. With the relatively recent availability of 3D-capable consumer-grade television sets, its' use is growing tremendously.

However, many people experience headaches and other adverse symptoms when viewing 3D content. One potential cause is that the 3D content is presented in a way that is not 'natural' to the viewer's brain—meaning that some aspect of the appearance of the content is not being accepted by the viewers brain properly.

SUMMARY OF THE INVENTION

The objectives of the invention disclosed below are:
1) To help 3D content appear more natural to a viewer.
2) Significantly reduce the computational power required to display/render 3D content to a viewer.

BRIEF DESCRIPTION OF DRAWING FIGURES

101—This is a remote eye-tracking device or equipment. It can be mounted on or inside the display device, or can be a device that is not physically touching the display.
102—This is the actual display producing the 3D content.
103—This is a head-mounted eye-tracking device.
104—This represents one or more viewers who are viewing the 3D content.
105—This represents a point of interest that appears to be closer to the viewer(s) then other content on the display.
106—This represents a point of interest that appears to be farther away in the distance then other content on the display.

DETAILED DESCRIPTION OF CERTAIN EMBODIMENTS OF THE INVENTION

For the purposes of this document, the particular spot a viewer is looking at of a scene will be called the viewer's "point of interest".

Currently, 3D content 105 and 106 is displayed with virtually all of the objects in a scene being presented in a sharp/in focus fashion. This is because the producer of the content does not know where the viewer 104 may be looking at any particular time, so to make sure that the viewer can see everything they are looking in focus, all the content is displayed in focus.

However, by having everything displayed in focus, depending on the scene and the viewers' point of interest 105 and 106, it could be confusing to the viewers' brain to "see" objects that should be out of focus, but are displayed in-focus. Accordingly, if a viewer tries to look at an object that is purposely being displayed out of focus, this will similarly cause confusion to the viewer's brain which expected the eyes to be able to refocus on what the viewer is looking at (point of interest).

The more accurate a system can simulate the "natural" viewing experience of the real-world, the more "believable" it will be to the viewer, allowing a new level of engagement with viewing content.

To simulate a real-world viewing experience, my invention will track a user's point of interest in an image/scene and constantly and dynamically adjust it so that any objects in the viewers point of interest are properly displayed in focus (the focal point), and objects that should not be in focus are not display in focus.

Various systems and methods already exist that can determine where a person is looking 101 and 103. In particular, by tracking a user's eye, these systems can determine what location on a display 102 they are looking at. Sensors can be located on special glasses 103 that each viewer wears, of a central sensor 101, such as a video camera can be placed on the display to monitor the viewer's eyes.

When you know where a viewer is looking 105 and 106 at in an image/scene, you then need to adjust the focus of all the objects in a scene to simulate how those objects would appear to the naked eye if the viewer was looking at the same point of interest in the real-world. This "processing" of the image/scene can performed in a number of ways:

Captured Images/Video:

Recently, a camera called Lytro has been developed that allows the taking of a picture without the need to "focus" the camera on any particular object before the picture is taken. The "focus" step is performed through software after the picture is taken. It accomplishes this by capturing all of the light paths of a scene when the picture is taken. Software for the camera allows the user to select the area of the image that it would like to see in focus. Then using mathematical algorithms, the software produces an image with the desired area in focus and other content displayed out of focus if such content would have been out of focus just as if the picture was originally taken using a conventional camera focused on the desired object.

Due to the complex nature of the focus algorithm and amount of data captured, it can easily take more then a second to not take a picture, but also to display an image after the user selects the desired focal point of a captured scene. However, as the algorithm is made more efficient and/or the hardware used to perform the computation increases, it is possible to produce a video camera that can capture in real-time all the light paths of a moving scene to produce a video that will allow any part of a scene to be made in-focus post-production. Thus, a viewer could enjoy viewing a 3D movie and be able to realistically view anywhere on the screen and be presented a view that will be virtually identical to as if the viewer were physically there while the movie was recorded.

Additionally, images captured with everything in focus can still be used by the invention by the utilizing special de-focusing software that can artificially make in-focus objects appear out of focus.

Real-Time Generated Content:

This invention can also be used for content that was not previously captured by a camera, but is instead generated in real-time as it is viewed. One example of this is with video games. High performance processors in a video game console are used to render/produce a three dimensional scene that can be in full motion. By tracking the player's point of interest, the console can make any objects in it appear in focus and other objects out of focus.

Multiple Viewers on a Single Display:

Recently electronic displays have been developed that can allow two or more people to view the same physical display, but yet see an entirely different scene/content then the other viewers. This is accomplished using parallax filters or active glasses that display multiplex images from different sources.

The invention can also enhance this multi-viewer technology. For example, the display could be configured to display the same scene of a movie to two different viewers, but by tracking each viewer's point of interest, each scene will be customized to display that viewers' point of interest in focus independently of the point of interest of the other viewer.

Additional Processing:

To simulate an even more natural experience for the viewer when they change from looking at one point of view to another of a scene/image, an artificial delay can be added to the refocus computation routine that emulates the eye's natural time it takes "to adjust" focus from the first point of interest to the new one because an instant change in focus could be perceived by the viewers brain as unnatural and reduce the viewing experience (believability) for the viewer.

In addition, the invention is not limited to using 3D content, 2D content can also be used with, the same dynamic focusing methods described here.

Enhance/Efficient Performance for Computer Generated Content:

High performance processors in a video game console are used to render/produce a three dimensional scene that can be in full motion. Depending upon the content and number of objects in a scene, it can be a very computationally demanding task to produce smooth fast motion action scenes. One reason for the high demand of computational power is that the console needs to render the entire scene in high detail so no matter where the player is looking on the screen, that object will be in sharp/focus and the lighting of various parts of a scene are rendered in a realistic manner. Because 30+ images have to be rendered every second, there is only so much detail and lighting effects that the processor could do in that time frame.

However, by using this invention, the console would only need to spend most of it's time rendering just the point of interest that the player is looking and not spend so much time on the area outside the players point of interest. This is because a person's can not see/appreciate much detail in their peripheral vision.

I claim:

1. A 3D content generation and display method, comprising the steps of:
    providing at least one eye-tracking system configured and positioned to determine at least one viewer's point of interest of a 3D scene being displayed to said at least one viewer; and
    generating said 3D scene using one or more processors running software so that said point of interest is visually in focus to said at least one viewer and wherein the focus of other objects in said 3D scene is determined by their respective visual depth in relation to a visual depth of said point of interest, and wherein generating said 3D scene further comprises:
        rendering said point of interest at a first level of detail, and
        rendering areas of the 3D scene that are outside of the viewer's point of interest at a lower level of detail relative to the first level of detail such that the computational time spent generating said 3D scene by said one or more processors is minimized dependent on said viewer's point of interest.

2. The method of claim 1, wherein said point of interest is a first point of interest having a first visual depth and wherein said 3D scene is a first 3D scene and wherein said eye-tracking system detects that said at least one viewer switched to a second point of interest having a second visual depth that is different from the first visual depth, and wherein the one or more processors running software to generate said 3D scene respond by generating a second 3D scene, wherein the focus of one or more objects of said second 3D scene are dependent on said second point of interest and wherein the time from displaying said first 3D scene to displaying said second 3D scene by the one or more processors is dependent on a difference between said first visual depth of the first point of interest and said second visual death of the second point of interest so as to emulate a natural delay of a human eye when changing focal depth.

3. A 3D content generator and display system comprising:
    at least one eye-tracking system configured to determine at least one viewer's point of interest of a 3D scene; and
    one or more processors running software to generate said 3D scene, wherein the software configures the processor to render a viewer's first point of interest of the 3D scene at a first level of detail, and render areas of the 3D scene that are outside of the viewer's first point of interest at a lower level of detail relative to the first level of detail such that the computational time spent rendering an area of said 3D scene by said one or more processors is minimized dependent on said viewer's point of interest.

* * * * *